US010460749B1

(12) United States Patent
Ru et al.

(10) Patent No.: US 10,460,749 B1
(45) Date of Patent: Oct. 29, 2019

(54) VOICE ACTIVITY DETECTION USING VOCAL TRACT AREA INFORMATION

(71) Applicant: Nuvoton Technology Corporation, Hsinchu (TW)

(72) Inventors: Powen Ru, San Jose, CA (US); Alex Paiz, Redwood, CA (US)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/021,724

(22) Filed: Jun. 28, 2018

(51) Int. Cl.
*G10L 25/78* (2013.01)
*G10L 15/16* (2006.01)
*G10L 15/22* (2006.01)
*G10L 25/21* (2013.01)
*G10L 15/06* (2013.01)

(52) U.S. Cl.
CPC ............ *G10L 25/78* (2013.01); *G10L 15/063* (2013.01); *G10L 15/16* (2013.01); *G10L 15/22* (2013.01); *G10L 25/21* (2013.01)

(58) Field of Classification Search
CPC ....... G10L 25/78; G10L 15/063; G10L 25/21; G10L 15/16; G10L 15/22
USPC ........................................................ 704/232
See application file for complete search history.

(56) References Cited

U.S. PATENT DOCUMENTS

| 6,959,274 B1* | 10/2005 | Gao ...................... G10L 19/20 704/219 |
| 2007/0147327 A1* | 6/2007 | Jin ........................ H04W 76/20 370/342 |
| 2008/0059170 A1* | 3/2008 | Bloebaum .............. G06F 16/68 704/233 |
| 2014/0222436 A1* | 8/2014 | Binder .................... G06F 3/167 704/275 |
| 2016/0093313 A1* | 3/2016 | Vickers .................. G10L 25/78 704/232 |
| 2019/0108831 A1* | 4/2019 | Fukuda ................. G10L 15/063 |

* cited by examiner

*Primary Examiner* — Bharatkumar S Shah
(74) *Attorney, Agent, or Firm* — Kilpatrick Townsend & Stockton LLP (57) ABSTRACT

A voice activity detection (VAD) system includes an input processing module configured to receive an acoustic signal, convert the acoustic signal into an analog signal, and subsequently, a digital signal; an energy-based detection module configured to receive one of the analog/digital signals and determine a sound activity decision; an area-function-based detection module configured to derive an area-related function from the digital signal and use a machine learning method to output an area-based decision according to the area related function; and a VAD decision module configured to make a final VAD decision based on the sound activity decision from the energy-based detection module and the area-based decision from the area-function-based detection module.

27 Claims, 6 Drawing Sheets

VOICE ACTIVITY DETECTION USING VOCAL TRACT AREA INFORMATION

BACKGROUND OF THE INVENTION

The present invention relates to voice activity detection (VAD). Embodiments of the invention relates to low-complexity voice activity detection (VAD) devices, systems, and methods.

Voice Activity Detection (VAD) is a technique used in speech processing in which the presence or absence of the human voice is detected. Known applications can include the following:

Storage compression: combined with lossy or lossless compression, may be done off-line.

Channel bandwidth reduction: e.g., GSM, G.729, combined comfort noise generator (CNG); this task must be done in real-time, where the hangover scheme is critical.

Near-end voice detection: as a means to control acoustic echo cancellation (AEC) model training; this task must be done in real-time.

Recently, VAD has been employed as a wake-up trigger, a front-end of more sophisticated keyword speech detection (e.g., provided by speech recognition vendors). This task must be done in real-time such that the processor undergoing further speech processing can be activated to a high power mode in time.

Most commercially available low-complexity voice activity detection (VAD) devices, systems, and methods apply an energy-based approach to detect voice activities. The energy-based VAD, given very little computing resource, faithfully detects voices in substantially quiet or rather noisy environments. However, this VAD tends to respond to whatever sudden energy changes including footsteps, keystrokes, paper friction, chair creaking, spoon clinking in a bowl or mug, etc. Frequent wake-ups due to false alarms increase undesirable power consumption that is not desirable for portable devices with limited battery life.

In order to discriminate voices from other sounds with sudden energy change, one skilled in the art often applies frequency analysis. However, Fourier transform or the like requires significant amounts of computation that is not desirable for an always-on portable device. Zero crossing rate is widely used and relatively inexpensive. It may be useful to screen out very low frequency machine noises, but not the other noises that contain high frequency contents (which may be coincident with some consonants). Another standout characteristic is pitch that can be extracted via autocorrelation method. High correlation suggests the incoming sounds may be vowels. But some non-voice sounds, e.g., tones, have high correlation, too. The high computation complexity also hinders the autocorrelation-based pitch extraction from low power application.

Therefore, it would be desirable to have a low complexity method for reducing false alarms and preventing the system from being unnecessarily activated to high power mode.

BRIEF SUMMARY OF THE INVENTION

The present invention relates to voice activity detection (VAD). Embodiments of the invention relate to low-complexity voice activity detection (VAD) devices, systems, and methods. More specifically, some embodiments of the invention are directed to extracting features of digitally sampled acoustic waveforms based on vocal tract area functions, and using the extracted features in machine-learning for voice activity detection. Embodiments of the invention can provide low-complexity voice activity detection (VAD) systems and methods to improve the efficiency of VAD applications.

In some embodiments, to prepare for machine learning, audio signals are selected to represent three classification: clean voice, noisy voice (voice in noisy environment), and noise. Next, features are extracted from frames, or short segments, of audio signals. For example, the features can be represented in vocal tract area functions, such as LARs (log area ratios) and/or derived features. The method then labels the frames into three classification: clean voice, noisy voice (voice in noisy environment), and noise. Information about these frames are provided to the machine learning process, e.g., neural network or logistic regression to train the classifier. The inventor has recognized that neural networks have been used successfully at graphic pattern recognition, and LARs are graphic-oriented features that describe the vocal tract shape that can be used to train a neural network to learn how to distinguish the voices and non-voices. Compared with conventional techniques, embodiments of the invention can provide low-complexity and higher efficiency voice activity detection (VAD) systems and methods. Conventional speech applications have used frequency-spectrum-based features such as line spectral pairs (LSPs) and Mel frequency cepstral coefficients (MFCCs) and their derivatives. However, two fast Fourier transforms (FFTs) are required to compute the MFCC. For example, some embodiments of the invention use linear predictive coefficients (LPC)-derived area-functions, such as LPCs, that have lower complexity than Fourier transform used in frequency analysis.

In some embodiments, a voice activity detection (VAD) system comprises an input processing module configured to receive an acoustic signal, convert the acoustic signal into an analog signal, and subsequently, a digital signal; an energy-based detection module configured to receive one of the analog/digital signals and determine a sound activity decision; an area-function-based detection module configured to derive an area-related function from the digital signal and use a machine learning method to output an area-based decision according to the area related function; and a VAD decision module configured to make a final VAD decision based on the sound activity decision from the energy-based detection module and the area-based decision from the area-function-based detection module.

According to some embodiments of the invention, a voice activity detection (VAD) system includes a microphone interface circuit configured for coupling to a microphone to receive an acoustic signal and to convert the acoustic signal to an analog signal, an analog-to-digital converter configured to receive the analog signal to generate a digital signal, and a signal processing circuit configured to receive the digital signal and to determine if the digital signal represents a human voice. The signal processing circuit includes an acoustic-energy-based detection module configured to receive one of the analog signal or the digital signal and to provide a sound activity decision that indicates if the acoustic signal is in an audible energy range. The signal processing circuit also includes an area-function-based detection module configured to extract features of the acoustic signal from the digital signal based on area-related functions, and to use a machine-learning method to determine an area-based decision that indicates if the audio signal represents a human voice. The machine-learning method includes a plurality of coefficients trained by a plurality of labeled area-related functions. The signal processing circuit also includes a voice activity detection (VAD) decision module configured to make a final VAD decision based on the sound activity decision from the energy-based detection module and the area-based decision from the area-function-based detection module. The voice activity detection (VAD) system can also include a resource-limited device configured to receive the final VAD decision to change an operating mode of the resource-limited device.

In some embodiments of the above VAD system, the area-related function can include one of a plurality of log-area-ratios, a log area function, an area function, and a sagittal distance function. In some embodiments, the area-function-based detection module is configured to perform filtering the digital signal with a pre-emphasis factor to obtain a pre-emphasized signal, weighting a frame of the pre-emphasized signal to a windowed signal by a window function, converting the windowed signal to a plurality of reflection coefficients, converting the plurality of reflection coefficients to the area-related function, feeding the area-related function to a trained classifier to identify onsets of voice; and issuing the area-based decision. In some embodiments, the trained classifier is trained offline by a neural network or a logistic regression.

According to some embodiments of the invention, a voice activity detection (VAD) system includes an input processing unit configured to receive an acoustic signal via a microphone. The input processing module configured to convert the acoustic signal into an analog signal, and subsequently, a digital signal. The VAD system can also include an energy-based detection module and an area-function-based detection module. The energy-based detection module is configured to receive one of the analog/digital signals and determine a sound activity decision. The area-function-based detection module is configured to derive an area-related function from the digital signal and use a machine learning method to output an area-based decision according to the area related function. The machine learning method can include a plurality of coefficients trained by a plurality of labeled area-related functions. The VAD system can also include a VAD decision module configured to make a final VAD decision based on the sound activity decision from the energy-based detection module and the area-based decision from the area-function-based detection module. The final VAD decision can be subsequently sent to a resource-limited device to change an operating mode of the device.

In various embodiments, the sound activity decision can have a soft decision value or a hard decision value.

Depending on the embodiments, the energy-based detection module can be a software module receiving the digital signal. Alternatively, the energy-based detection module can be a hardware block. For example, the energy-based detection module can be a digital hardware block receiving the digital signal. In another example, the energy-based detection module can be an analog hardware block receiving the analog signal.

In various embodiments, the area-related function can be a plurality of log-area-ratios. Alternatively, the area-related function can be one of a log area function, an area function, and a sagittal distance function.

In some embodiments, the area-function-based detection module is configured to perform the steps of:
  filtering the digital signal with a pre-emphasis factor to obtain a pre-emphasized signal;
  weighting a frame of the pre-emphasized signal to a windowed signal by a window function;
  converting the windowed signal to a plurality of reflection coefficients;
  converting the plurality of reflection coefficients to the area-related function;
  feeding the area-related function to a trained classifier to identify onsets of voice; and
  issuing the area-based decision.

In various embodiments, the pre-emphasis factor can range from 0.5 to 0.99, and the frame shift can range from 1 millisecond to 20 milliseconds.

In various embodiments, the window function can be one of Blackman, Blackman-Harris, Bohman, Chebyshev, Gaussian, Hamming, Hanning, Kaiser, Nuttall, Parzen, Taylor, and Tukey functions.

In some embodiments, the trained classifier can be trained by a neural network offline. In other embodiments, the trained classifier can be trained by a logistic regression offline.

In various embodiments, the area-based decision can be a soft decision value. Alternatively, the area-based decision can be a hard decision value.

In some embodiments, the area-function-based detection module is configured to further generate a linear predictive error and include this error value to be a feature in the area-based decision.

In some embodiments, the voice activity detection (VAD) system can also include a zero-crossing-based detection module configured to generate a second decision based on the zero crossing rate, wherein the VAD decision module includes the second decision in a final decision process. Depending on the embodiments, the second decision can be a soft decision value or the second decision is a hard decision value.

In some embodiments, the resource-limited device can be a low power device, and the operating mode of the low power device can include an idle mode and a wake up mode. In some embodiments, the resource-limited device can be a voice storage device, and the operating mode can include an idle mode and a recording mode. In alternative embodiments, the resource-limited device can be a voice transmitting device, and the operating mode can include an idle mode and a transmitting mode.

BRIEF DESCRIPTION OF THE DRAWINGS

For a more complete understanding of the disclosure, reference should be made to the following detailed description and accompanying drawings wherein.

DETAILED DESCRIPTION OF THE INVENTION

Figure 1:
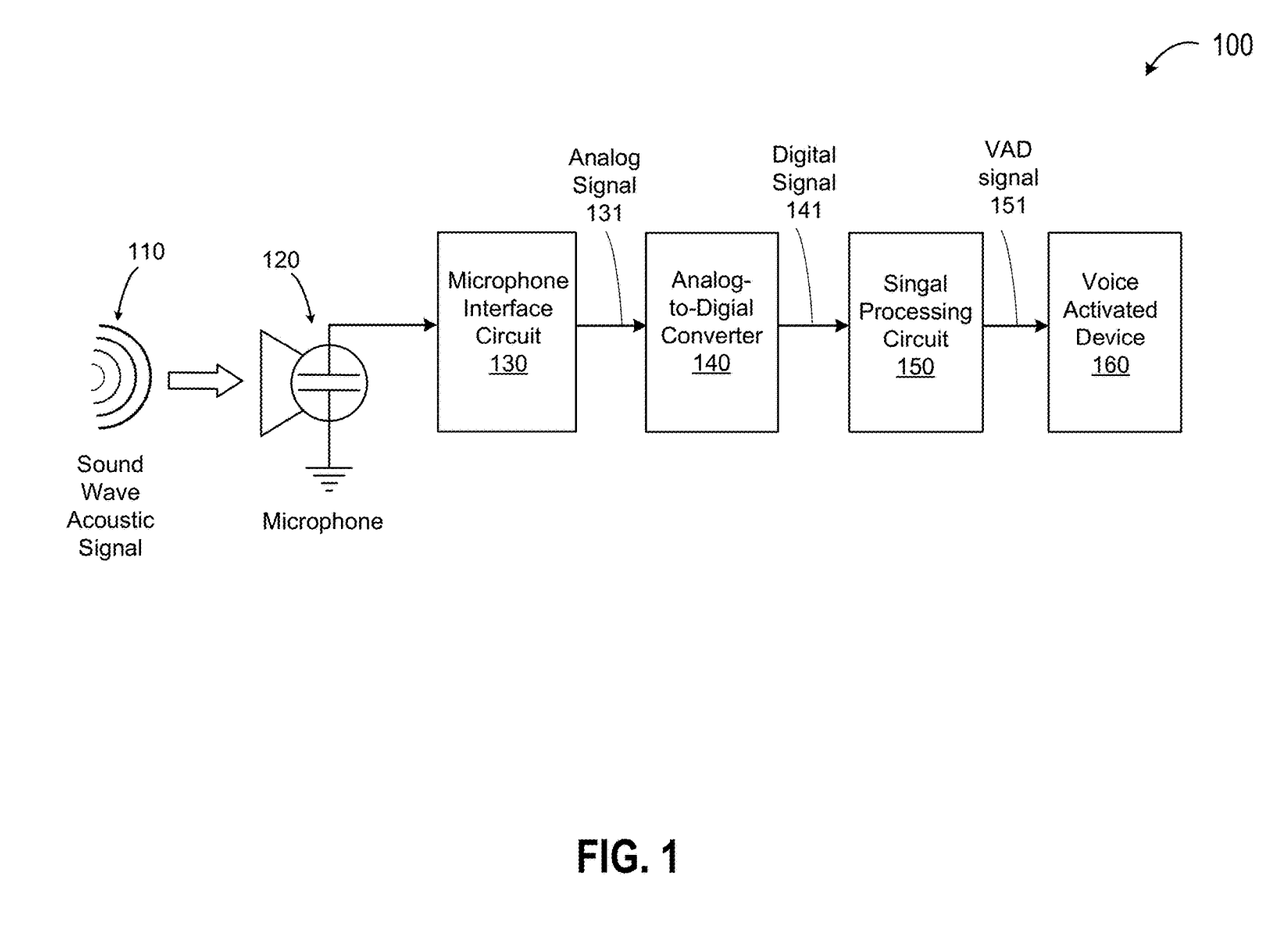
FIG. 1 is a block diagram illustrating a voice activated system according to various embodiments of the present invention.

FIG. 1 is a block diagram of a voice-activated system in accordance with an embodiment of the invention. As shown in FIG. 1, the voice-activated system 100 includes a microphone 120, a microphone interface circuit 130, an analog-to-digital converter 140, a signal processing circuit 150, and a device with two operating modes 160. According to other embodiments of the invention, the voice activated system 100 includes an acoustic transducer, an acoustic detector, an analog-to-digital converter, and a processing element.

As shown in FIG. 1, the microphone 120 and microphone interface circuit 130 are configured to capture acoustic energy associated with sound wave 110 to generate an analog signal 131. According to embodiments of the invention, the sound wave 110 can be in a frequency range that can include a human-audible frequency range. Several different types of microphones can be used, which employ different methods to convert the air pressure variations of a sound wave to an electrical signal. A condenser microphone uses the vibrating diaphragm as a capacitor plate. An electret microphone is a type of electrostatic capacitor-based microphone using a dielectric material with a permanently embedded static electric dipole moment. The microphone interface circuit 130 can include conventional circuit elements to work with the microphone 120 to capture acoustic energy associated with sound wave 110 to generate an analog signal 131.

The analog-to-digital converter 140 converts the analog signal 131 to a digital signal 141.

In FIG. 1, the signal processing circuit 150 receives digital signal 141 to determine if the digital signal 141 represent a human voice, and provides a voice activity detection (VAD) signal 151 to a voice-activated device 160. In embodiments of the invention, the signal processing circuit 150 may include a processor, such as a RISC (reduced instruction set computer) or a DSP (digital signal processor).

In some embodiments, the voice-activated device 160 can be a resource-limited device, and the final VAD decision is sent to the resource-limited device to change an operating mode of the resource-limited device. For example, the resource-limited device can be a low power device, and the operating mode can include an idle mode and a wake-up mode. The low-power device can be configured to stay in a low-power idle mode, and can be activated into a wake-up mode when a voice is detected. In another example, the resource-limited device can be a voice storage device, and the operating mode can include an idle mode and a recording mode. The voice storage device can be configured to stay in a low-power idle mode, and can be activated to start recording when a voice is detected. In yet another example, the resource-limited device can be a voice transmitting device, and the operating mode can include an idle mode and a transmitting mode. In these examples, the voice transmitting device can be configured to stay in a low-power idle mode, and can be activated when a voice is detected to start transmitting.

Figure 2:
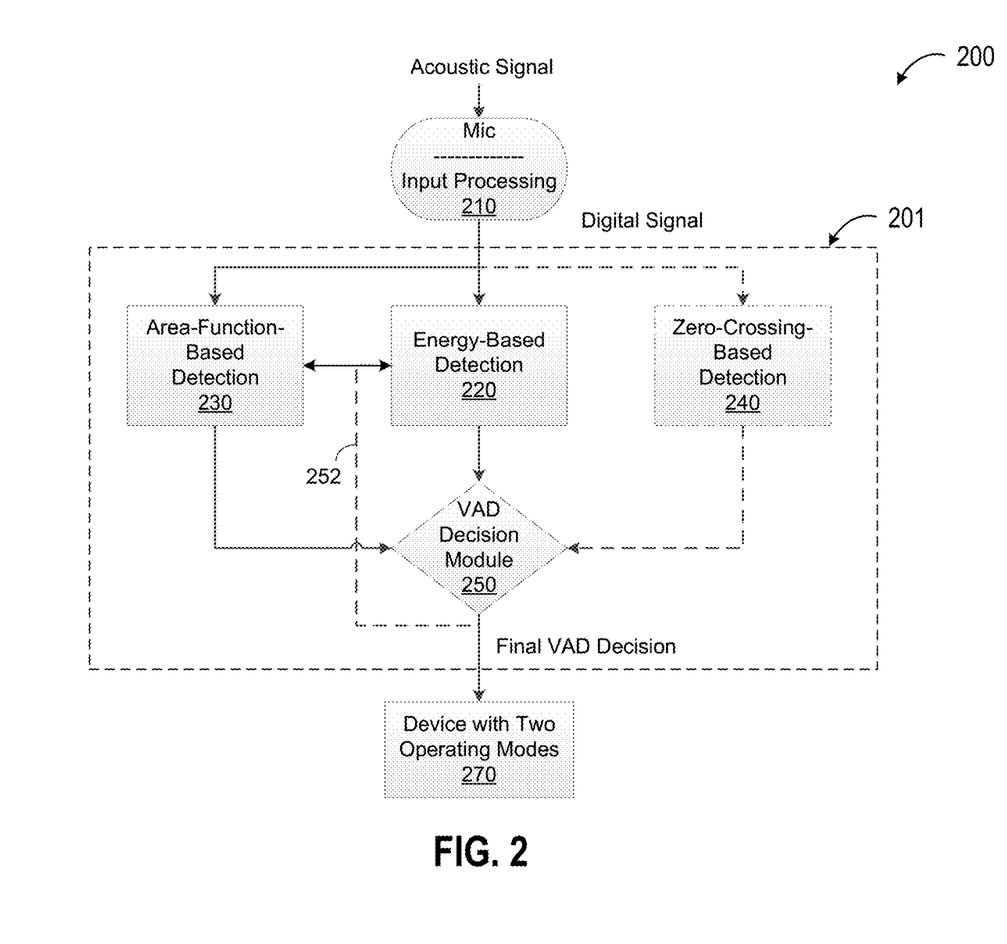
FIG. 2 is a block diagram illustrating a voice activity detection (VAD) system according to various embodiments of the present invention.

FIG. 2 is a block diagram of a voice activity detection (VAD) system according to various embodiments of the present invention. In FIG. 2, voice activity detection (VAD) system 200 can include an input processing module 210, an energy-based detection module 220, an area-function-based detection module 230, and a VAD decision module 250. The system may further comprise a zero-crossing-based detection module 240.

The input processing module 210 converts acoustic signals into analog signals, and subsequently DC-free sampled digital signals. Compared with FIG. 1, the input processing module 210 can correspond to the microphone 120, the microphone interface circuit 130, and the analog-to-digital converter 140.

FIG. 2 also illustrates an example of the signal processing circuit 150 in a block 201, which includes the energy-based detection module 220, the area-function-based detection module 230, the optional zero-crossing-based detection module 240, and the VAD decision module 250.

The energy-based detection module 220 continuously estimates the short-term root-mean-square (RMS) and long-term RMS of the DC-free signals. The module compares the short-term RMS and the long-term RMS to determine a preliminary VAD decision. In some embodiments, the preliminary VAD decision can indicate that the DC-free signal is in the sound frequency range, for example, about 300 Hz to 3000 Hz. The energy-based detection module is configured to generate a sound activity decision. The sound activity decision can provide either a hard decision value or a soft decision value. For example, a hard decision value of "0" can indicate that the signal is not in the sound frequency range, and a hard decision value of "1" can indicate that the signal is in the sound frequency range. A soft decision value can be a value between "0" and "1" and provides an estimated likelihood that the signal is in the sound frequency range. Merely as an example, the short-term root-mean-square (RMS) of the signals can be estimated over a period of 4 milliseconds to 64 milliseconds, and the long-term root-mean-square (RMS) of the signals can be estimated over a period of 100 milliseconds to 600 milliseconds. In some embodiments, two thresholds (THR0 and THR1) can be defined as functions of long-term RMS (RMS_LT). For example, THR0=a0*RMS_LT+b0 and THR1=a1*RMS_LT+b1, where a0 and a1 are greater than 1, b0 and b1 are predetermined offsets, and THR1>=THR0. When the short-term RMS exceeds the threshold THR1, the decision is 1; when the short-term RMS is lower than the threshold THR0, the decision is 0. If the short-term RMS is between THR0 and THR1, a soft decision can be interpolated between 0 and 1. In a special case that THR0=THR1, only hard decision value is allowed.

Depending on the embodiments, the energy-based detection module can be a software module receiving the digital signal. Alternatively, the energy-based detection module can be a hardware block. For example, the energy-based detection module can be a digital hardware block receiving the digital signal. In another example, the energy-based detection module can be an analog hardware block receiving the analog signal.

The area-function-based detection module 230 is configured to extract features of the audio signal, and use this information to determine whether the audio signal represent a human voice. The features of the audio signal can be represented by linear predictive coefficients (LPC), reflection coefficients (RC), and log area ratio (LAR). In some embodiments, the area-function-based detection module 230 provides information related to log area ratio (LAR). Linear predictive coding is a tool used in audio signal processing and speech processing for representing the spectral envelope of a digital signal of speech in compressed form, using the information of a linear predictive model. It is one of the speech analysis techniques for encoding good quality speech at a low bit rate and provides accurate estimates of speech parameters. The reflection coefficients (RC) and the log area ratio (LAR) are representations of LPCs.

In some embodiments, the area-function-based detection module 230 is configured to extract log-area-ratios (LARs) and/or related quantities, and uses this information to determine a VAD enable control signal. In some embodiments, the area-function-based detection module 230 first preconditions the audio signal, then extracts the linear predictive coefficients (LPC) of the audio signal, and converts the linear predictive coefficients (LPC) to log-area-ratios (LAR).

The zero-crossing-based detection module 240 is configured to generate a zero-crossing-based decision, being either a hard decision value or a soft decision value. For example, the zero-crossing-based detection module 240 can include a counter to track the number of sign changes of the signal in a time period. It can be implemented as a software module, a digital hardware block, or a mixed-signal hardware block.

The VAD decision module 250 is configured to receive results from the energy-based detection module 220 and area-function-based detection module 230 to provide a final VAD decision. For example, a final VAD decision can indicate whether a human voice or the on-set of a human voice is detected. In some embodiments, the voice activity detection (VAD) system can also include a zero-crossing-based detection module 240 configured to generate a second decision based on the zero crossing rate. In this case, the VAD decision module 250 can include the second decision in a final decision process. Depending on the embodiments, the second decision can have a soft decision value or a hard decision value. The final VAD decision 260 can be a VAD decision flag. In some embodiments, the final VAD decision 260 can be a function of intermediate decisions from energy-based detection module 220 and area-function-based detection module 230, and the zero-crossing-based detection module 240. For example, d_product=d_energy*d_area*d_zero-crossing, where "d_product" is the final decision, "d_energy" is an energy-based decision, "d-area" is an area-function-based detection, and "d_zero-crossing" is a zero-crossing-based decision. If d_product exceeds a predetermined threshold, the final decision is 1 (i.e., VAD-ON); otherwise the final decision is 0 (i.e., VAD-OFF). For hard decisions, the output would be 0 or 1; for soft decisions, the output would a number ranging from 0 to 1. In FIG. 2, a feedback path 252 can be provided from VAD Decision Module to the Area-function-based detection and Energy-based detection. The final decision can feedback to the two detection modules, so it can be used to adjust some parameters and/or thresholds in the decision modules.

The final VAD decision (e.g., the final VAD decision signal 260) can be subsequently sent to a resource-limited device 270 to change an operating mode of the device. In some embodiments, the resource-limited device can be a low power device, and the operating mode of the low power device can include an idle mode and a wake up mode. In some embodiments, the resource-limited device can be a voice storage device, and the operating mode can include an idle mode and a recording mode. In alternative embodiments, the resource-limited device can be a voice transmitting device, and the operating mode can include an idle mode and a transmitting mode.

The VAD decision module 250 can issue a VAD enable control signal, e.g., a VAD-ON signal, when the onset of voices is identified. The VAD enable control signal can be used to activate a resource-limited device. The resource-limited device may be a low power device having two operating modes: idle mode and wake up mode. Before being triggered by a VAD-ON decision, the low power device operating in idle mode consumes minimal power, but is not fully functional. After being triggered by the VAD-ON decision, the low power device operating in wake up mode is fully functional but requires more power. Once the VAD decision is OFF, the low power device goes back to idle mode.

For example, the resource-limited device may be a voice storage device having two operating modes: idle mode (VAD-OFF) and recording mode (VAD-ON). By incorporating the area-based decision with other decisions, one can reduce the number of false triggers, therefore, reducing overall storage usage.

As another example, the resource-limited device may be a voice transmitting device having two operating modes: idle mode (VAD-OFF) and transmitting mode (VAD-ON). By incorporating the area-based decision with other decisions, one can reduce the number of false triggers, therefore reducing overall transmitting bandwidth.

By incorporating the area-based decision with other decisions, such as energy-based decisions and zero-crossing-based decisions, one can reduce the number of false triggers therefore reduce overall power consumption.

Figure 3:
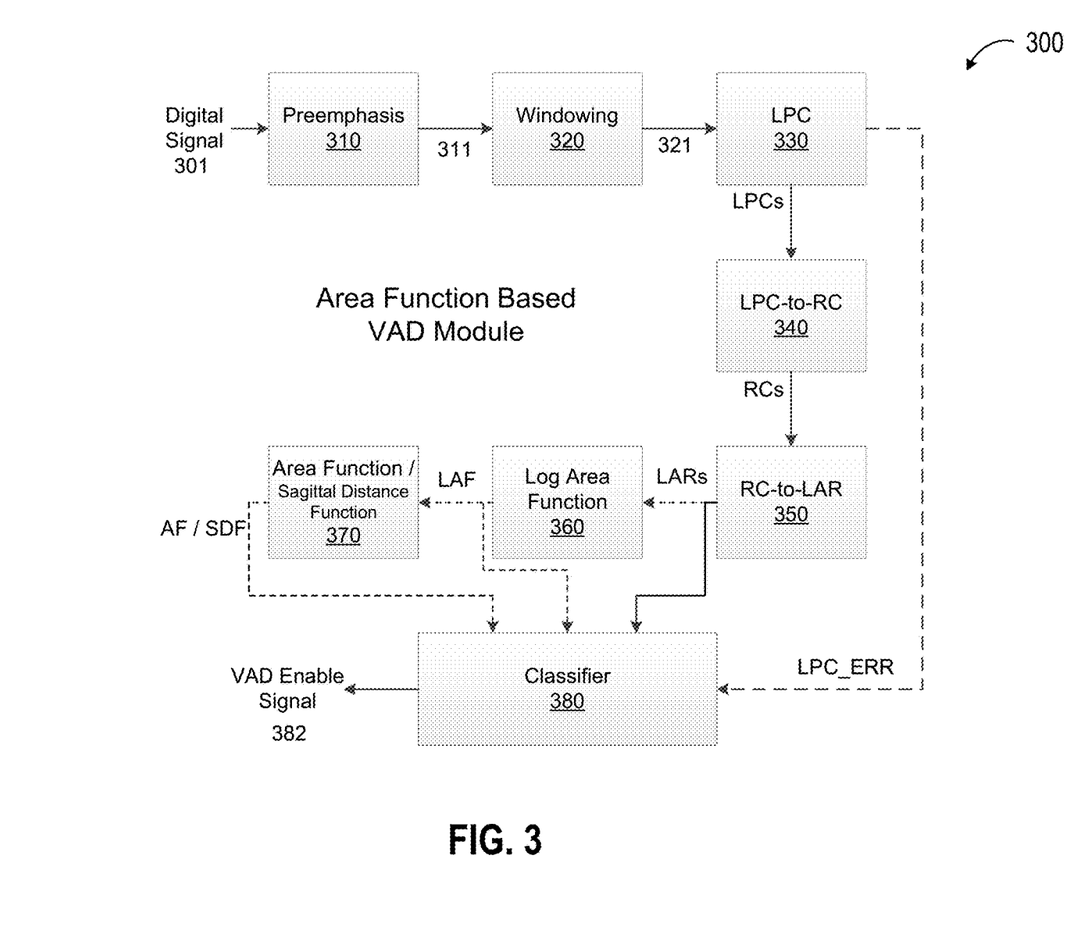
FIG. 3 a block diagram illustrating an area-function-based detection module according to various embodiments of the present invention.

FIG. 3 a block diagram illustrating an area-function-based detection module according to various embodiments of the present invention. As shown in FIG. 3, area-function-based detection module 300 is an example module that can be used as area-function-based detection module 230. In some embodiments, area-function-based detection module 300 can include a pre-emphasis unit 310 and a windowing unit 320 for preconditioning the audio signal. Area-function-based detection module 300 can also have a linear predictive coefficients (LPC) unit 330, an LPC-to-RC unit 340, and an RC-to-LAR unit 350 for extracting the log area ratios of the audio signal. Area-function-based detection module 300 can also have a log area function unit 360 and an area function/sagittal distance function unit 370. Further, the area-function-based detection module 300 can also have a classifier unit 380. The functions of these units are explained in more detail below.

In the pre-emphasis unit 310, the digital signal 301 is filtered with a pre-emphasis factor p to obtain a pre-emphasized signal 311. Let the digital signal 301 be represented by x[1], x[2], . . . , x[n−1], x[n]. Then, the pre-emphasized signal 311, $x_p[n]$ can be expressed as follows.

$x_p[n]=x[n]-p \cdot x[n-1]$, where the pre-emphasis factor p is p=0.5~0.99.

In some embodiments, the pre-emphasized signal 311 may suppress low frequency signals and boost high frequency signals. The pre-emphasis factor p can be selected based on the application.

The windowing unit 320 is configured for weighting a frame of the pre-emphasized signal 311 to a windowed signal 321 by a window function w[n]. Examples of the window function can include Blackman, Blackman-Harris, Bohman, Chebyshev, Gaussian, Hamming, Hanning, Kaiser, Nuttall, Parzen, Taylor, Tukey, etc. The windowed signal 321 can be expressed as follows.

$x_w[n]=w[n]x_p[n]$

Depending on the embodiments, the window function can be determined according to, for example, Blackman, Blackman-Harris, Bohman, Chebyshev, Gaussian, Hamming, Hanning, Kaiser, Nuttall, Parzen, Taylor, Tukey, etc.

The linear predictive coefficients (LPC) unit 330 is configured to extract the linear predictive coefficients (LPCs) from the windowed signal 321. In some embodiments, the linear predictive coefficients (LPCs) can be derived using, e.g., Levinson-Durbin recursion. A prediction error (LPC_ERR) can be a by-product of the process.

The LPC-to-RC unit 340 is configured to convert the LPCs to reflection coefficients (RCs, k(i)), using Levinson's recursion. Note that the RCs can be obtained from the same recursion in the LPC module.

The RC-to-LAR unit 350 is configured to convert the RCs to log-area-ratios (LARs, g(i)), which can be expressed as"

$$g(i) = \log\left(\frac{1 - k(i)}{1 + k(i)}\right)$$

The log area function unit 360 is configured to derive a log area function (LAF) from the LARs. The log area function (LAF) can be express as:

$$LAF(i) = \sum_{j=1}^{i} g(j)$$

The area function/sagittal distance function unit 370 is configured to derive an area function (AF) can be derived from the LAF. The area function (AF) can be expressed as:

AF(i)=log(LAF(i))

The area function/sagittal distance function unit 370 can also be configured to derive a sagittal distance or diameter function (SDF) from the LARs. The sagittal distance or diameter function (SDF) can be expressed as:

SDF(i)=log(LAF(i)/2)

The classifier unit 380 can be an offline-trained classifier to identify the onset of voices based on one or more of the area-related functions (e.g., LARs, LAF, AF, or SDF) and issue a VAD enable control signal (or area-based decision).

In some embodiments, a method for training the classifier unit 380 can include collecting LARs and/or one more of the derived features (LAF, AF, or SDF) and obtaining the first derivatives of the features as additional features. The method can also include labeling the frames into three classifications: clean voice, noisy voice (voice in noisy environment), and noise. Next, the classifier can be trained using machine learning (e.g., neural network, logistic regression, etc.), as described further below.

To prepare for machine learning, audio signals are selected to represent three classification: clean voice, noisy voice (voice in noisy environment), and noise. Next, features are extracted from frames, or short segments, of audio signals. For example, the features can be represented in LARs and/or some of other derived features (e.g., LAF, AF, or SDF). The method then labels the frames into three classification: clean voice, noisy voice (voice in noisy environment), and noise. Information about these frames are provided to the machine learning process, e.g., neural network or logistic regression to train the classifier.

Figure 4:
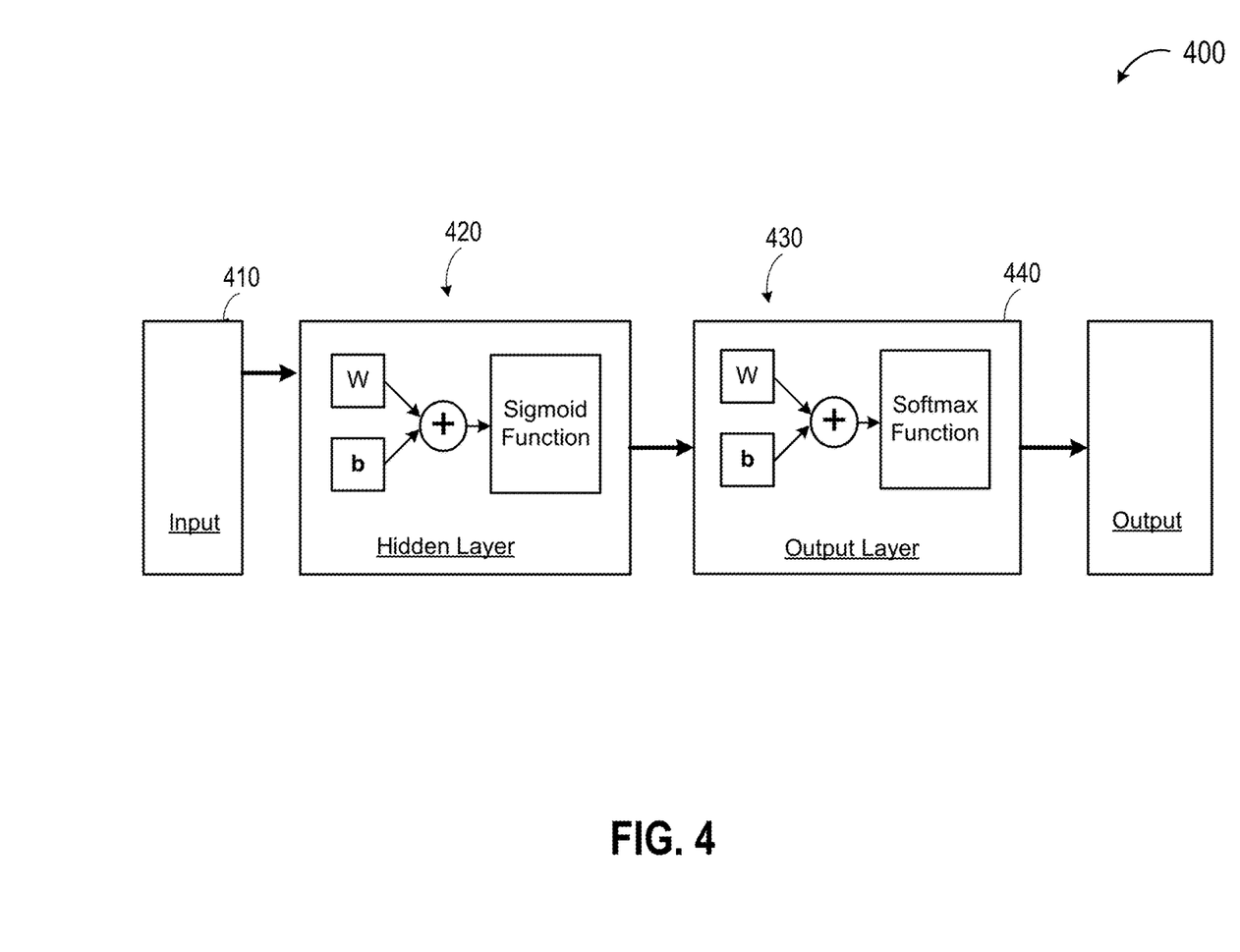
FIG. 4 a block diagram illustrating an exemplar neural network according to various embodiments of the present invention.

In some embodiments, neural networks can be applied to perform the offline machine learning. FIG. 4 is a block diagram illustrating an exemplar two-layer feed-forward neural network that can also be used to build the area-function-based detection module according to embodiments of the present invention. In the example shown in FIG. 4, feedforward neural network 400 includes an input port 410, a hidden layer 420, an output layer 430, and an output port 440. In this network, the information moves in only one direction, forward, from the input nodes, through the hidden nodes and to the output nodes. In FIG. 4, W represents a weighting vector, and b represents a bias factor.

In some embodiments, the hidden layer 420 can have sigmoid neurons, and the output layer 430 can have softmax neurons. A sigmoid neuron has an output relationship defined by a sigmoid function, which is a mathematical function having a characteristic "S"-shaped curve or sigmoid curve. Sigmoid functions have domain of all real numbers, with return value monotonically increasing most often from 0 to 1 or alternatively from −1 to 1, depending on the application. A wide variety of sigmoid functions can be used as the activation function of artificial neurons, including the logistic and hyperbolic tangent functions.

In the output layer 430, a softmax neuron has an output relationship defined by a softmax function. The softmax function, or normalized exponential function,[1]:198 is a generalization of the logistic function that "squashes" a K-dimensional vector z of arbitrary real values to a K-dimensional vector σ (z) of real values, where each entry is in the range (0, 1), and all the entries adds up to 1. The output of the softmax function can be used to represent a categorical distribution—that is, a probability distribution over K different possible outcomes. The softmax function is often used in the final layer of a neural network-based classifier. In FIG. 4, "W" represents a weighting vector, and "b" represents a bias factor.

To achieve reasonable classification, at least 10 neurons should be assigned in the first hidden layer. If more hidden layers are used, any number of neurons can be used in the additional hidden layer. Given more computing resources, more neurons or layers can be assigned. Providing enough neurons in its hidden layer, the performance can be improved. More complicated networks (e.g., convolutional neural network or recurrent neural network) can also be applied to achieve better performance. Given enough neurons in its hidden layer, it can classify vectors arbitrarily well.

Figure 5:
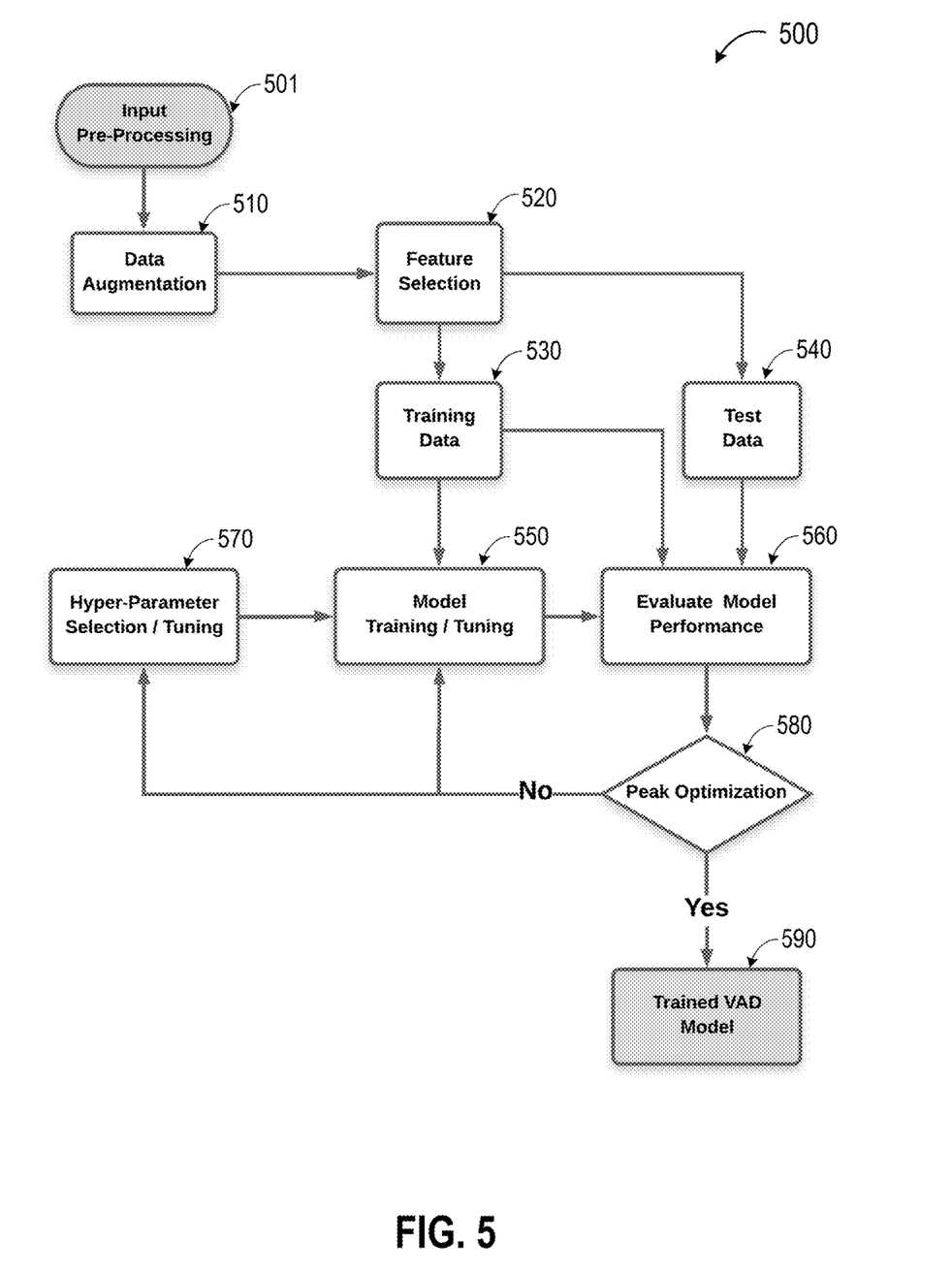
FIG. 5 is a flow chart illustrating an exemplar logistic regression method according to various embodiments of the present invention.

FIG. 5 is a block diagram illustrating an exemplar area-function-based detection module based on logic regression according to embodiments of the present invention. As shown in FIG. 5, area-function-based detection module 500 includes an input preprocessing stage 501, a data augmentation unit 510, a feature selection unit 520, a training data unit 530, a test data unit 540, a model training and tuning unit 550, an evaluate model performance unit 560, a hyper-parameter selection/tuning unit 570, and a peak optimization unit 580.

FIG. 5 shows the signal path for the development of the voice activity detection classifier via machine learning. In the data augmentation block 510, the relationship between current and past predictors is used to map raw features into dimensions better suitable for the voice detection problem. The feature selection block 520 is configured to picking the best feature mappings found in the previous block. It sets apart the best candidates for final modeling and passes the mapped data sets to the following blocks. The entire dataset is then spliced into two sub-sets "training data" 530 and "test data" 540 to construct a supervised-learning cross-validated machine learning model. The percentage of data used for testing can range from 5%-20%. The model training/tuning block 550 contains a logistic regression classifier that performs the forward pass on the training set by multiplying the features by the weights of the function, adding them, and passing the result through a sigmoid activation function. The evaluate model performance block 560 is configured to obtain the loss of the model by calculating the cross-entropy error of the current state of the model for both the training and testing datasets. The hyper-parameter selection/tuning block 570 can include both hand-picked (e.g., learning rate, lambda value, etc.) and optimizable parameters. Once the error is propagated back to this block, it performed an optimization pass on the model by adjusting the value of each weight proportionally to the error. The peak optimization conditional block 580 keeps track of the error at each epoch and calculates the accuracy and recalls of the model. It then compares the results against tolerance values to decide whether or not to perform the optimization step. At the end of the training process, the trained voice activity detection (VAD) model 590 is provided.

The final training set can be generated by performing an n-th (e.g., 3rd) order polynomial feature mapping on the features as described above, e. g., clean voice, noisy voice, and noise. It consists of m (e.g., 91) features that converged at more adequate decision boundaries considering non-linear relationships in the training data. The general parts of the logistic regression algorithm are:

$$\text{Cost function } J(\theta) = -\frac{1}{m}\sum_{i=1}^{m}[y_i\log(h_\theta(x_i)) + (1-y_i)\log(1-h_\theta(x_i))]$$

$$\theta = \text{weights}$$

$$h_\theta(x) = sigmoid(\theta^T x)$$

$$\text{Gradient descent: } \theta_j = \theta_j - \frac{\alpha}{m}\sum_{i=1}^{m}(h_\theta(x_i) - y_i)x_{ij}$$

Figure 6:
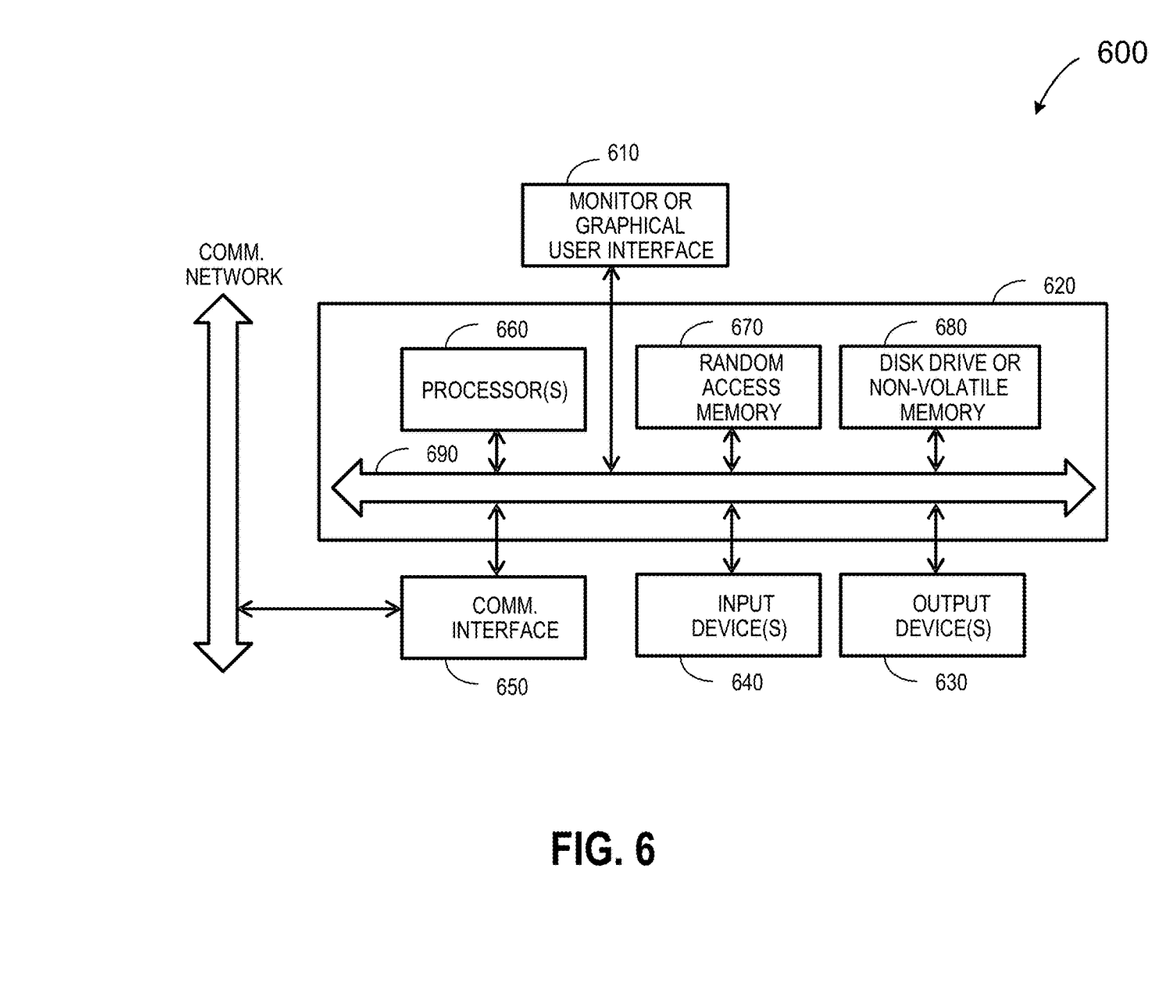
FIG. 6 is a simplified block diagram illustrating an apparatus that may be used to implement various embodiments according the present invention.

FIG. 6 is a simplified block diagram illustrating an apparatus that may be used to implement various embodiments according the present invention. FIG. 6 is merely illustrative of an embodiment incorporating the present disclosure and does not limit the scope of the disclosure as recited in the claims. One of ordinary skill in the art would recognize other variations, modifications, and alternatives. In one embodiment, computer system 600 typically includes a monitor 610, a computer 620, user output devices 630, user input devices 640, communications interface 650, and the like.

FIG. 6 is representative of a computer system capable of embodying the present disclosure. For example, voice activated system 100 can be implemented using a system similar to system 600 depicted in FIG. 6. The functions of signal processing circuit 150 can be carried out by one or more processors depicted in FIG. 6. The microphone interface circuit 130, analog-to-digital converter 140 and voice activated device 160 can be peripheral devices in a system similar to system 600. Moreover, the offline training of the machine-learning systems can be carried out in a system similar to system 600 depicted in FIG. 6.

As shown in FIG. 6, computer 620 may include a processor(s) 660 that communicates with a number of peripheral devices via a bus subsystem 690. These peripheral devices may include user output devices 630, user input devices 640, communications interface 650, and a storage subsystem, such as random access memory (RAM) 670 and disk drive 680.

User input devices 640 can include all possible types of devices and mechanisms for inputting information to computer system 620. These may include a keyboard, a keypad, a touch screen incorporated into the display, audio input devices such as voice recognition systems, microphones, and other types of input devices. In various embodiments, user input devices 640 are typically embodied as a computer mouse, a trackball, a track pad, a joystick, wireless remote, drawing tablet, voice command system, eye tracking system, and the like. User input devices 640 typically allow a user to select objects, icons, text and the like that appear on the monitor 610 via a command such as a click of a button or the like.

User output devices 630 include all possible types of devices and mechanisms for outputting information from computer 620. These may include a display (e.g., monitor 610), non-visual displays such as audio output devices, etc.

Communications interface 650 provides an interface to other communication networks and devices. Communications interface 650 may serve as an interface for receiving data from and transmitting data to other systems. Embodiments of communications interface 650 typically include an Ethernet card, a modem (telephone, satellite, cable, ISDN), (asynchronous) digital subscriber line (DSL) unit, FireWire interface, USB interface, and the like. For example, communications interface 650 may be coupled to a computer network, to a FireWire bus, or the like. In other embodiments, communications interfaces 650 may be physically integrated on the motherboard of computer 620, and may be a software program, such as soft DSL, or the like.

In various embodiments, computer system 600 may also include software that enables communications over a network such as the HTTP, TCP/IP, RTP/RTSP protocols, and the like. In alternative embodiments of the present disclosure, other communications software and transfer protocols may also be used, for example IPX, UDP or the like. In some embodiments, computer 620 includes one or more Xeon microprocessors from Intel as processor(s) 660. Further, in one embodiment, computer 620 includes a UNIX-based operating system. Processor(s) 660 can also include special-purpose processors such as digital signal processor (DSP), reduced instruction set computer (RISC), etc.

RAM 670 and disk drive 680 are examples of tangible storage media configured to store data such as embodiments of the present disclosure, including executable computer code, human readable code, or the like. Other types of tangible storage media include floppy disks, removable hard disks, optical storage media such as CD-ROMS, DVDs and bar codes, semiconductor memories such as flash memories, read-only memories (ROMS), battery-backed volatile memories, networked storage devices, and the like. RAM 670 and disk drive 680 may be configured to store the basic programming and data constructs that provide the functionality of the present disclosure.

Software code modules and instructions that provide the functionality of the present disclosure may be stored in RAM 670 and disk drive 680. These software modules may be executed by processor(s) 660. RAM 670 and disk drive 680 may also provide a repository for storing data used in accordance with the present disclosure.

RAM 670 and disk drive 680 may include a number of memories including a main random access memory (RAM) for storage of instructions and data during program execution and a read-only memory (ROM) in which fixed non-transitory instructions are stored. RAM 670 and disk drive 680 may include a file storage subsystem providing persistent (non-volatile) storage for program and data files. RAM 670 and disk drive 680 may also include removable storage systems, such as removable flash memory.

Bus subsystem 690 provides a mechanism for letting the various components and subsystems of computer 620 communicate with each other as intended. Although bus subsystem 690 is shown schematically as a single bus, alternative embodiments of the bus subsystem may utilize multiple busses.

FIG. 6 is representative of a computer system capable of embodying the present disclosure. It will be readily apparent to one of ordinary skill in the art that many other hardware and software configurations are suitable for use with the present disclosure. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

Certain embodiments have been described. However, various modifications to these embodiments are possible, and the principles presented herein may be applied to other embodiments as well. In addition, the various components and/or method steps/blocks may be implemented in arrangements other than those specifically disclosed without departing from the scope of the claims. Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A voice activity detection (VAD) system, comprising:
a microphone interface circuit configured for coupling to a microphone to receive an acoustic signal and to convert the acoustic signal to an analog signal;
an analog-to-digital converter configured to receive the analog signal to generate a digital signal; and
a signal processing circuit configured to receive the digital signal and to determine if the digital signal represents a human voice, wherein the signal processing circuit comprises:
an acoustic-energy-based detection module configured to receive one of the analog signal or the digital signal and to provide a sound activity decision that indicates if the acoustic signal is in an audible energy range;
an area-function-based detection module configured to extract features of the acoustic signal from the digital signal based on area-related functions, and to use a machine-learning method to determine an area-based decision that indicates if the acoustic signal represents a human voice, wherein the machine-learning method comprises a plurality of coefficients trained by a plurality of labeled area-related functions; and
a voice activity detection (VAD) decision module configured to make a final VAD decision based on the sound activity decision from the acoustic-energy-based detection module and the area-based decision from the area-function-based detection module; and
a resource-limited device configured to receive the final VAD decision to change an operating mode of the resource-limited device.

2. The system of claim 1, wherein the area-related function comprises one of a plurality of log-area-ratios, a log area function, an area function, and a sagittal distance function.

3. The system of claim 1, wherein the area-function-based detection module is configured to perform:
filtering the digital signal with a pre-emphasis factor to obtain a pre-emphasized signal;
weighting a frame of the pre-emphasized signal to a windowed signal by a window function;
converting the windowed signal to a plurality of reflection coefficients;
converting the plurality of reflection coefficients to the area-related function;
feeding the area-related function to a trained classifier to identify onsets of voice; and
issuing the area-based decision.

4. The system of claim 3, wherein the trained classifier is trained offline by a neural network or a logistic regression.

5. A voice activity detection (VAD) system, comprising:
an input processing module configured to receive an acoustic signal via a microphone, the input processing module configured to convert the acoustic signal into an analog signal, and subsequently, a digital signal;
an energy-based detection module configured to receive one of the analog signal or the digital signal and determine a sound activity decision;
an area-function-based detection module configured to derive an area-related function from the digital signal and use a machine learning method to output an area-based decision according to the area-related function, wherein the machine learning method comprises a plurality of coefficients trained by a plurality of labeled area related functions;
and
a VAD decision module configured to make a final VAD decision based on the sound activity decision from the energy-based detection module and the area-based decision from the area-function-based detection module, wherein the final VAD decision is subsequently sent to a resource-limited device to change an operating mode of the resource-limited device.

6. The system of claim 5, wherein the energy-based detection module is a software module receiving the digital signal.

7. The system of claim 5, wherein the energy-based detection module is a digital hardware block receiving the digital signal.

8. The system of claim 5, wherein the energy-based detection module is an analog hardware block receiving the analog signal.

9. The system of claim 5, wherein the area-related function is a plurality of log-area-ratios.

10. The system of claim 5, wherein the area-related function comprises one of a plurality of log-area-ratios, a log area function, an area function, and a sagittal distance function.

11. The system of claim 5, wherein the sound activity decision is a soft decision value.

12. The system of claim 5, wherein the sound activity decision is a hard decision value.

13. The system of claim 5, wherein the area-function-based detection module is configured to perform the steps of:
filtering the digital signal with a pre-emphasis factor to obtain a pre-emphasized signal;
weighting a frame of the pre-emphasized signal to a windowed signal by a window function;
converting the windowed signal to a plurality of reflection coefficients;
converting the plurality of reflection coefficients to the area-related function;
feeding the area-related function to a trained classifier to identify onsets of voice; and
issuing the area-based decision.

14. The system of claim 13, wherein the pre-emphasis factor ranges from 0.5 to 0.99.

15. The system of claim 13, wherein a frame shift ranges from 1 millisecond to 20 milliseconds.

16. The system of claim 13, wherein the window function is one of Blackman, Blackman-Harris, Bohman, Chebyshev, Gaussian, Hamming, Hanning, Kaiser, Nuttall, Parzen, Taylor, and Tukey.

17. The system of claim 13, wherein the trained classifier is trained by a neural network offline.

18. The system of claim 13, wherein the trained classifier is trained by a logistic regression offline.

19. The system of claim 13, wherein the area-based decision is a soft decision value.

20. The system of claim 13, wherein the area-based decision is a hard decision value.

21. The system of claim 13, wherein the area-function-based detection module is configured to further generate a linear predictive error and include this error value to be a feature in the area-based decision.

22. The system of claim 5, further comprises a zero-crossing-based detection module configured to generate a second decision based on a zero crossing rate, wherein the VAD decision module includes the second decision in a final decision process.

23. The system of claim 22, wherein the second decision is a soft decision value.

24. The system of claim 22, wherein the second decision is a hard decision value.

25. The system of claim 5, wherein the resource-limited device is a low power device and the operating mode comprises an idle mode and a wake up mode.

26. The system of claim 5, wherein the resource-limited device is a voice storage device and the operating mode comprises an idle mode and a recording mode.

27. The system of claim 5, wherein the resource-limited device is a voice transmitting device and the operating mode comprises an idle mode and a transmitting mode.

* * * * *